(12) United States Patent
Wagenschein

(10) Patent No.: US 9,815,326 B2
(45) Date of Patent: Nov. 14, 2017

(54) METHOD FOR BALANCING A WHEEL

(71) Applicant: Wegmann automotive GmbH & Co. KG, Veitshöchheim (DE)

(72) Inventor: Dietmar Wagenschein, Veitshöchheim (DE)

(73) Assignee: WEGMANN AUTOMOTIVE GMBH & CO. KG, Veitshöchheim (DE)

( * ) Notice: Subject to any disclaimer, the term of this patent is extended or adjusted under 35 U.S.C. 154(b) by 24 days.

(21) Appl. No.: 14/720,133

(22) Filed: May 22, 2015

(65) Prior Publication Data

US 2015/0266339 A1 Sep. 24, 2015

Related U.S. Application Data

(63) Continuation of application No. PCT/EP2013/073713, filed on Nov. 13, 2013.

(30) Foreign Application Priority Data

Nov. 23, 2012 (EP) ..................................... 12194092

(51) Int. Cl.
*B60B 15/28* (2006.01)
*F16F 15/32* (2006.01)

(52) U.S. Cl.
CPC ............ *B60B 15/28* (2013.01); *F16F 15/324* (2013.01); *B60B 2310/214* (2013.01); *B60B 2310/226* (2013.01); *B60B 2310/318* (2013.01); *B60B 2360/10* (2013.01); *B60B 2360/32* (2013.01); *B60B 2900/1214* (2013.01)

(58) Field of Classification Search
CPC .......... F16F 15/32; F16F 15/34; F16F 15/324; F16F 15/328

USPC ................................................. 301/5.21, 5.22
See application file for complete search history.

(56) References Cited

U.S. PATENT DOCUMENTS

| 2,193,734 | A | * | 3/1940 | MacCracken | ......... | F16F 15/324 |
| | | | | | | 152/154.1 |
| 4,998,448 | A | * | 3/1991 | Ellis, Jr. | .................. | F16F 15/32 |
| | | | | | | 156/330 |
| 6,334,568 | B1 | * | 1/2002 | Seeds | .................... | F16F 15/322 |
| | | | | | | 228/114.5 |

(Continued)

FOREIGN PATENT DOCUMENTS

| EP | 1 759 893 | 3/2007 |
| FR | 2 792 048 | 10/2000 |
| WO | WO/2008/103651 | 8/2008 |

OTHER PUBLICATIONS

International Search Report and Written Opinion in International Application No. PCT/EP2013/073713 dated Feb. 20, 2014.

(Continued)

*Primary Examiner* — Jeffrey J Restifo
(74) *Attorney, Agent, or Firm* — Norton Rose Fulbright US LLP

(57) ABSTRACT

A method for balancing a wheel comprises at least the steps of extruding a profile of an uncured and/or non-vulcanized viscoelastic polymer comprising at least one filler having a total density of more than 0.9 kg/dm$^3$, cutting a section from an extruded profile of said polymer, wherein the length of the section correlates with the required mass for balancing, applying the balancing weight to the rim of the wheel, and curing of the balancing weight at the wheel.

6 Claims, 2 Drawing Sheets

(56) References Cited

U.S. PATENT DOCUMENTS

| | | | | |
|---|---|---|---|---|
| 6,364,421 B1* | 4/2002 | Pursley | ................ | F16F 15/328 |
| | | | | 301/5.21 |
| 7,712,840 B2* | 5/2010 | Fogal, Sr. | ............... | B60B 21/00 |
| | | | | 301/5.21 |
| 2010/0213755 A1* | 8/2010 | Fogal, Sr. | ............. | F16F 15/366 |
| | | | | 301/5.22 |
| 2014/0368024 A1* | 12/2014 | Heger | ................... | F16F 15/324 |
| | | | | 301/5.21 |
| 2015/0266339 A1* | 9/2015 | Bode | .................... | F16F 15/324 |
| | | | | 301/5.21 |
| 2016/0102731 A1* | 4/2016 | Vogler | ................. | F16F 15/324 |
| | | | | 301/5.21 |
| 2016/0252159 A1* | 9/2016 | Wagenschein | ........ | F16F 15/324 |
| 2016/0369868 A1* | 12/2016 | Belknap | ................ | F16F 15/345 |

OTHER PUBLICATIONS

International Preliminary Report on Patentability in International Application No. PCT/EP2013/073713 dated Jun. 4, 2015.

* cited by examiner

METHOD FOR BALANCING A WHEEL

PRIORITY CLAIM

This application is a continuation of co-pending International Application No. PCT/EP2013/073713 filed on Nov. 13, 2013, which designates the United States and claims priority from European Application No. 12194092.8, filed on Nov. 23, 2012, both of which are incorporated herein by reference in their entireties.

BACKGROUND OF THE INVENTION

1. Field of the Invention

The invention relates to a method for balancing a vehicle wheel as well as weights and materials for weights used in vehicle ballasting applications, and in particular to weights used in balancing automobile or other vehicle wheels.

2. Description of Relevant Art

In automotive wheel balancing, individual wheel balancing weights are applied to specific positions of a rim. Two types of balancing weights are used. The first kind is a balancing weight which is attached by a clamp, as disclosed in the European patent EP 1 613 876 B1, while the second kind is fixed by means of a self-adhesive tape, as disclosed in U.S. Pat. No. 6,364,421 B1.

Both kinds of balancing weights are available in a plurality of sizes, resulting in different weights. When balancing a vehicle wheel, the correct size of balancing weight is selected and attached to the rim. Most balancing weights are supplied as bulk material in boxes, from which the required number of weights is manually taken.

This allows for a simple, comparatively cheap supply of balancing weights. The drawback is that the person who is taking the weights from the box may take a wrong weight, and therefore a further step of balancing is required. Furthermore, the process of taking the weights can hardly be automated. Therefore, other solutions as disclosed in WO 2008/103651 A1, using a continuous polymer tape, have been developed. This has the drawback that the polymer tape is significantly less robust and more expensive than a solid balancing weight.

In EP 1 759 893 A1 a method for balancing tires is disclosed, where a continuous strip of a mass material is formed by an extruder into the inner surface of a tire. As the inner surface is only accessible, before mounting the tire to a rim, this method is not applicable to balancing a ready assembled wheel.

SUMMARY OF THE INVENTION

The embodiments are based on the object of providing a method for balancing a wheel, a method for manufacturing a balancing weight material and the balancing weight, as well as balancing weights resulting thereof which are very robust, can be manufactured easily by a low number of manufacturing steps and have a comparatively low price.

In an embodiment, a method for balancing a wheel comprises at least one of the steps of forming a balancing weight from an uncured and/or non-vulcanized (or sulfurized) viscoelastic polymer, applying the balancing weight to the rim of the wheel or the wheel and finally curing the balancing weight at the wheel. Preferably, the polymer comprises at least one filler, preferably resulting in a total density of more than 0.9 $kg/dm^3$. Prior art balancing weights are cured before applying them to a wheel. This requires additional processing step for curing. The balancing weights according to the first embodiment do not need this step of curing before applying the balancing weights to a rim. This simplifies manufacturing of the balancing weights, saves energy, production time and tooling costs. Uncured balancing weights have plastic material characteristics and therefore can easily be formed as required, while cured balancing weights have elastic material characteristics which do not allow permanent forming of the material. Furthermore, uncured balancing weights have a much more adhesive surface compared to cured balancing weights. Therefore, the adhesive force of the surface of uncured weights may be sufficient to hold the weight to a rim, even without using further adhesive means like adhesive tapes. This allows a better, quicker and more reliable fixing of the uncured balancing weights to a rim. Curing of the balancing weights takes place after the balancing weights have been attached to a rim. Curing happens by time even under ambient temperatures. When a vehicle having uncured balancing weights is in operation, curing is accelerated by higher temperatures as they are caused by sun radiation, by frictional heat of the tires, or by heat dissipated from the brakes. Furthermore, curing may be started or accelerated by methods and devices known in the art. Accordingly, the rim with uncured balancing weights may be heated and/or baked in an oven, receive UV (ultraviolet) radiation or may be sulfurized or treated by a chemical agent or a combination thereof.

Preferably, the step of forming a balancing weight comprises cutting a section from an extruded profile of said polymer. It is preferred, if this extruded profile has a constant mass per length units, so that the length of the section correlates with the required mass of the balancing weight.

A method for manufacturing of a balancing weight material which may be used for the method above comprises at least the steps of mixing the polymer with particles of a high density material and forming the mixture to a preformed body. This preformed body preferably is a profile and/or strip and/or strand and/or plate and most preferably is extruded to its form.

It is most preferred, to provide the balancing weight material as a strand, from which pieces having a length required to obtain a specific weight may be cut. Furthermore, pieces of balancing weights may be provided in a size as required and a mass as required. There may be already cut pieces having weights of 2 g, 5 g, 10 g, 20 g. It is further preferred, to attach a liner or any other non-adhesive material which may be a thin plastic film to the preformed body or pieces thereof.

Most preferably, the polymer comprises a copolymer of ethylene and at least one of acrylate, preferably methylacrylate or a curing and/or vulcanization agent. This copolymer may be VAMAC (a trademark of DuPont). Also, a natural or synthetic rubber, which may be polychloroprene may be used as polymer.

It is further preferred, if the high-density material comprises at least one of steel, stainless steel, tungsten, zinc or zinc oxide any other suitable material, preferably in particles, having sizes this a d50 value below 150 μm. It is further preferred, if the material comprises a mixture of varying particle sizes in the range down to 1 μm. Preferably, there is above 5% and below 35% in volume of high density material related to the elastomer, although it may also be possible to use between 35% and 65% of high density material. By adding a higher percentage of filler, the material may be made more stiff and inflexible. Therefore, the mechanical properties may be adjusted by selecting the proper degree of high-density material. In a further preferred embodiment, a further low-density material, which may comprise carbon particulates or carbon dust, may be added for further adjustment of mechanical properties without gaining too much weight. In general, the preferred range of density is between 3 to 5 and 6 g/cm$^3$. The mechanical properties of the balancing weight material may be adjusted by high density material and low density material, such that the balancing weight material is comparatively stiff and solid, even without curing, therefore having comparable properties to cured balancing weight materials.

In a further preferred embodiment, the method includes a further step of inserting a core of weight material into the elastomer material. This core of weight material may be an elastomer with enclosed high-density material, preferably having higher specific weight than the surrounding elastomer. Furthermore, the core of weight material may be a solid high-density material like steel, stainless steel, tungsten zinc or zinc oxide or any other suitable material. It may comprise smaller particles or slices of such materials. If a core of weight material is provided, further inclusion of high density material into the elastomer surrounding the weight material is not necessary. Therefore, the core of weight material may be enclosed by elastomer without high density material.

In another embodiment, the method includes the further step of providing a layer of an uncured and/or non-vulcanized viscoelastic polymer at at least one surface of the balancing weight material. Most preferably, this layer has no low density and/or high density material and/or at least a lower degree of low-density and/or high density material. This provides an adhesive surface thereon, allowing a better adhesion to the rim and/or an adhesive tape.

Preferably, a further step of attaching a self-adhesive tape to one side of the balancing weight material is provided. Such a self-adhesive tape allows simple fixing of the balancing weights to a rim.

Is further preferred, to include a step of providing a liner to one surface of the balancing weight material, preferably be covering the adhesive surface which may either be defined by an adhesive polymer or by a self-adhesive tape for protection of this surface.

In another embodiment, a balancing weight material comprising an uncured and/or non-vulcanized viscoelastic polymer is provided. It may comprise any of the features as disclosed above. Preferably it comprises particles of at least one high-density material being formed as an extruded profile and/or strip and/or strand and/or plate as disclosed above.

Preferably, the polymer comprises a copolymer of ethylene and at least one of acrylate, preferably methylacrylate or a curing and/or vulcanization agent. It is preferred, if the high-density material comprises at least one of steel, stainless steel, tungsten zinc or zinc oxide. It is further preferred to have a layer of elastomer material with a lower content of particles at one surface of the balancing weight material providing an adhesive surface. Furthermore a self-adhesive tape and/or a liner may be provided at one surface of the balancing weight material.

The balancing weight material disclosed herein is specifically designed for absorbing vibrations due to its high mass and elasticity. Furthermore, the material is more heat resistant than standard plastic material and it is resistant against most chemicals, which are used in cars, like fuel and oil and UV radiation. Due to its rough surface, it may be easily glued to any other surface like a rim. Furthermore, a dye or metal particles like aluminum may be added to improve the outer appearance.

According to a further embodiment, a balancing weight comprises a balancing weight material as disclosed herein.

It is obvious, that the invention is not limited to balancing weight for vehicles. Instead these balancing weights may be used everywhere, where an additional weight may be applied.

BRIEF DESCRIPTION OF THE DRAWINGS

In the following, the invention will be described by way of example, without limitation of the general inventive concept, on examples of embodiment and with reference to the drawings.

Figure 1:
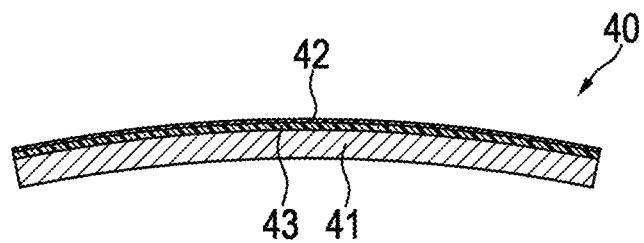
FIG. 1 shows a preferred embodiment.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

In FIG. 1, a preferred embodiment is shown. A balancing weight body is made of a polymer composition providing mass, and therefore taking the function of the weight. For fixing the balancing weight to a rim, an adhesive tape 43 is provided. For protection, the adhesive tape is covered by a liner 42 which must be peeled off before applying the balancing weight to a rim. The weight material is preferably provided as a strand having a width between 5 mm and 5 cm, preferably between 2 cm and 3 cm and a height between 2 mm and 2 cm, most preferably in the range between 3 mm and 8 mm.

Figure 2:
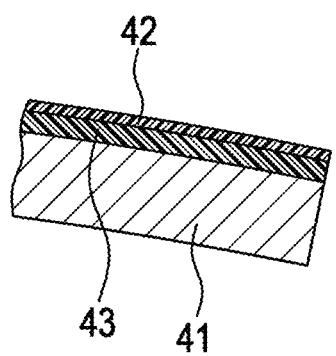
FIG. 2 shows the balancing weight in detail.

FIG. 2 shows the balancing weight in detail.

Figure 3:
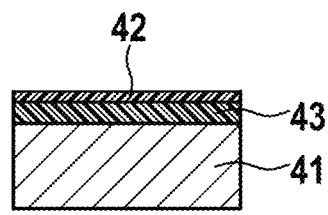
FIG. 3 shows a sectional view.

In FIG. 3, a sectional view (front view) of a weight material strand is shown.

Figure 4:
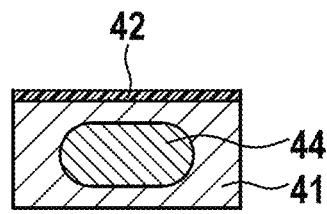
FIG. 4 shows a sectional view with enclosed weight material core.

In FIG. 4, a sectional view of weight strand or plate with an enclosed weight material core 44 is shown. This weight material core may also be an elastomer with enclosed high-density material, preferably having higher specific weight than the surrounding elastomer 41. Furthermore, the weight material core may be a solid high-density material like steel, stainless steel, tungsten or zinc or any other suitable material. This weight material core may be combined with all other embodiments disclosed herein.

Figure 5:
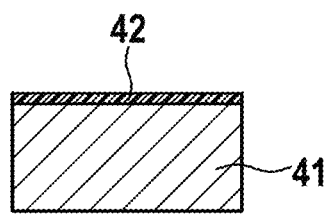
FIG. 5 shows a sectional view of a self-adhesive balancing weight.

In FIG. 5, a self-adhesive balancing weight strand or plate is shown. Herein the balancing weight is fixed by the self-adhesive properties of the elastomer material. There may be provided a liner 42 to protect the adhesive surface. This balancing weight may also have an enclosed weight material as explained above.

Figure 6:
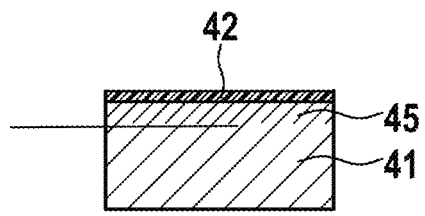
FIG. 6 shows a sectional view of an improved self-adhesive balancing weight.

In FIG. 6, an improved self-adhesive balancing weight strand or plate is shown. As the adhesive force of the elastomer be a material decreases with an increased volume of filler and/or high density material, an additional layer of elastomer without or with a lower degree of filler is added at one surface to improve the adhesive force to a rim. It is furthermore referred to provide a liner to protect the adhesive surface.

It will be appreciated to those skilled in the art having the benefit of this disclosure that this invention is believed to provide balancing weights. Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

LIST OF REFERENCE NUMERALS 40 balancing weight
41 balancing weight body
42 liner
43 adhesive tape
44 weight material core
45 additional layer of elastomer

The invention claimed is:

1. Method for balancing a wheel, comprising the steps of:
    extruding a profile of a mixture of viscoelastic polymer and at least one filler, the mixture having a total density of more than 0.9 kg/dm$^3$, the viscoelastic polymer being uncured and non-vulcanized;
    cutting a section from the extruded profile of said mixture, wherein the length of the section correlates with a desired mass for balancing;
    applying the section as a balancing weight to a rim of a wheel, and
    curing the section on the wheel.

2. Method according to claim 1, further comprising the step of:
    providing a self-adhesive tape at a surface of the profile before applying the section to the rim of the wheel.

3. Method according to claim 1, further comprising the step of:
    providing a layer of viscoelastic polymer at a surface of the profile of the section, and providing an adhesive surface on the layer, before applying the section to the rim of the wheel,
    where the layer of viscoelastic polymer is uncured and non-vulcanized.

4. Method according claim 1, wherein the polymer comprises a copolymer of ethylene and at least one component selected from the group consisting of: acrylate, methylacrylate, a curing agent, a vulcanization agent, and a curing and vulcanization agent.

5. Method according to claim 1, wherein the high-density material comprises at least one material selected from the group consisting of: steel, stainless steel, tungsten, zinc, and zinc oxide.

6. Method according to claim 1, further comprising the step of:
    inserting a core of weight material into the mixture.

* * * * *